April 18, 1944.　　A. E. SIDWELL　　2,347,134
TEMPERATURE COMPENSATION MEANS FOR PRESSURE ACTUATED INDICATORS
Filed June 29, 1938　　2 Sheets-Sheet 1
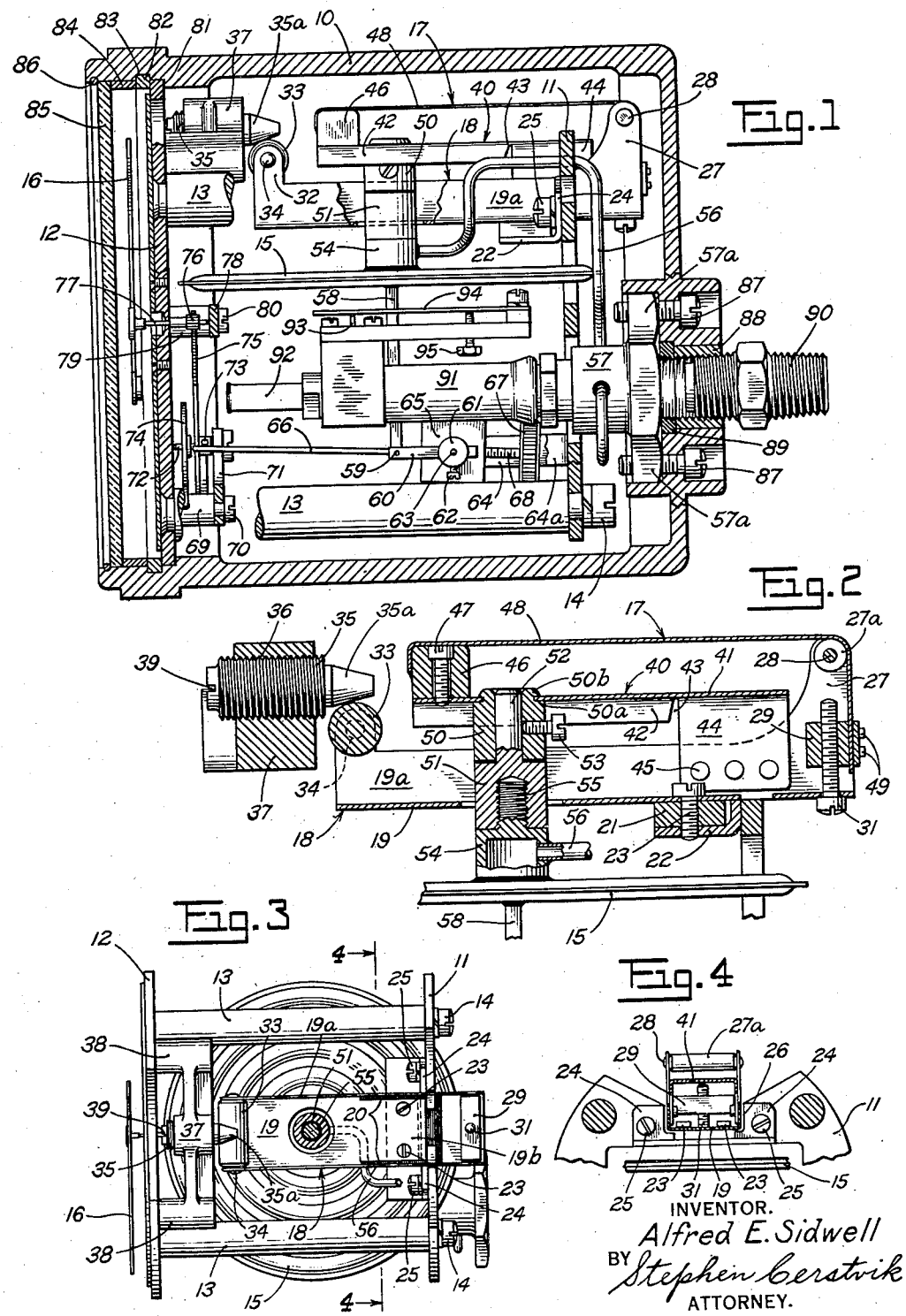
INVENTOR.
Alfred E. Sidwell
BY Stephen Cerstvik
ATTORNEY.

April 18, 1944.  A. E. SIDWELL  2,347,134
TEMPERATURE COMPENSATION MEANS FOR PRESSURE ACTUATED INDICATORS
Filed June 29, 1938  2 Sheets-Sheet 2
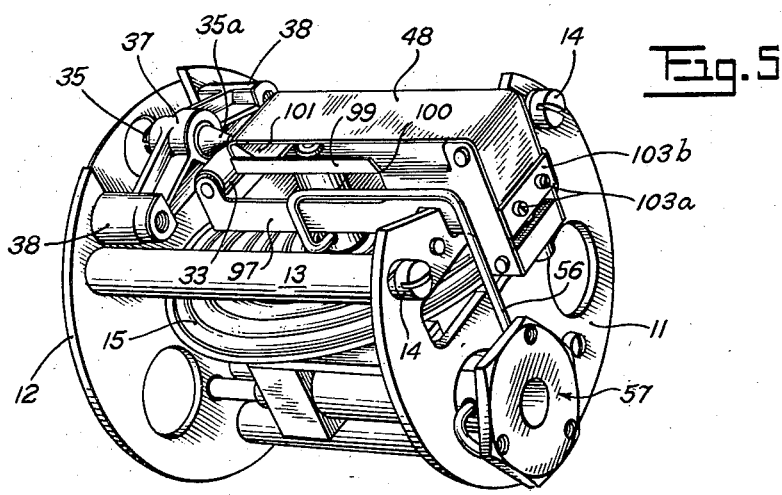
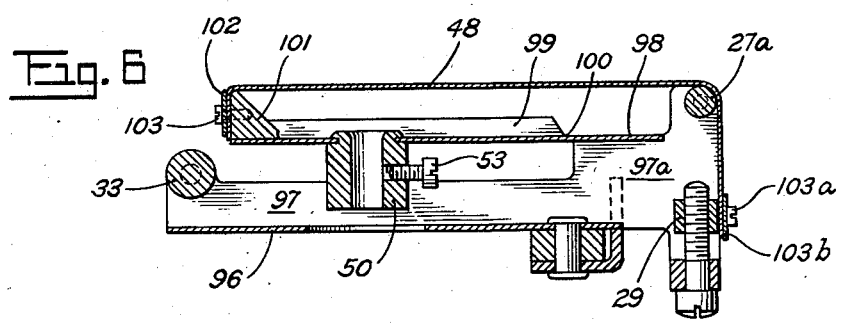
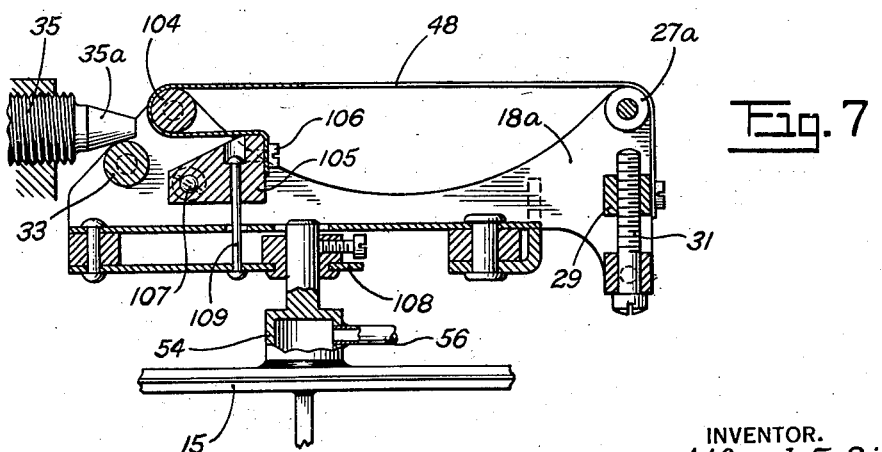
INVENTOR.
Alfred E. Sidwell
BY Stephen Cerstvik
ATTORNEY.

Patented Apr. 18, 1944

2,347,134

UNITED STATES PATENT OFFICE 2,347,134

TEMPERATURE COMPENSATION MEANS FOR PRESSURE ACTUATED INDICATORS

Alfred E. Sidwell, Kew Gardens, N. Y., assignor to Bendix Aviation Corporation, South Bend, Ind., a corporation of Delaware Application June 29, 1938, Serial No. 216,580

12 Claims. (Cl. 73—179)

The present invention relates to pressure responsive indicating instruments and more particularly to instruments of the type wherein a differential between the pressures on two sides of a pressure responsive element, established by a change in one of said pressures, is utilized to operate an indicator, and wherein means are provided for the equalization of said pressures, when said change no longer takes place. An example of such an instrument is a rate-of-climb indicator and the invention is illustrated and described hereinafter in connection with such an instrument, but it will be understood that it is not restricted to this particular use and may be embodied in aneroid altimeters, manifold pressure gauges, airspeed indicators and the like.

Similar devices of the prior art have been utilized wherein, due to changes in temperature, changes in the pressure differential have been produced which were not truly indicative of the value of the quantity varying with said changes. In such devices of the prior art, it has been the practice to provide means controlled by changes in temperature to control, eliminate or offset the changes in pressure due to said changes in temperature.

Even with the utilization of such temperature responsive devices for compensating for changes in temperature, the devices were either completely or partly inapplicable to the solution of the difficulty, upon sudden changes in temperature, and the temperature compensation achieved has not been commensurate with the amount of error introduced by the temperature change.

In view of the above conditions prevailing in the prior art, one of the objects of the present invention is to provide novel temperature compensating means whereby the foregoing undesirable characteristics are eliminated.

Another object of the invention is to provide novel compensating means wherein the compensating effect is produced by a rate of change of temperature in contra-distinction to compensation produced by the amount of change of temperature.

A further object is to provide a novel method of temperature compensation whereby errors due to sudden changes in temperature are compensated by utilization of a force proportional to the rate of change of temperature.

Still another object is to provide a novel instrument of the type characterized above in which means expanding and contracting with changes in temperature, at a rate different from the rate of expansion or contraction of the remaining elements of the instrument, are utilized to provide temperature compensation.

Still another object is to provide novel compensating means for compensating for the rate of change of temperature in an indicating instrument of the pressure responsive type.

A further object is to provide a novel instrument of the class described which requires substantially no insulation against changes in temperature.

Still another object is to provide a novel rate of climb indicator of dependable performance which will be accurate under all changes and rates of change in temperature.

The above and further objects and advantages of the invention will appear more fully hereinafter from a consideration of the detailed description which follows, taken together with the accompanying drawings wherein are illustrated several embodiments of the invention. It is to be expressly understood, however, that the drawings are for purposes of illustration and description only and are not designed as a definition of the limits of the invention, reference primarily being had for this purpose to the appended claims.

In the drawings, wherein like reference characters refer to like parts throughout the several views:

Fig. 1 is a side elevation, in section, of the operating mechanism and casing of one embodiment of the present invention;

Fig. 2 is an enlarged sectional view of the compensating means shown in Fig. 1, illustrating the means for attaching the same to the other elements of the mechanism;

Fig. 3 is a top view illustrating the compensating means, with a part thereof removed, and the means for maintaining said means in position relative to the remainder of the mechanism;

Fig. 4 is a sectional view taken on line 4—4 of Fig. 3;

Fig. 5 is a perspective view of the entire mechanism of the instrument, with the casing removed, illustrating another embodiment of the compensating means;

Fig. 6 is an enlarged sectional view illustrating the compensating means shown in Fig. 5; and Fig. 7 is an enlarged sectional view of another embodiment of the compensating means, illustrating the means for attaching the same to the other elements of the mechanism.

Referring to the drawings, and more particularly to Fig. 1, the invention is shown in the present instance as applied to a rate-of-climb indicating instrument mounted in a casing 10 and including an operating mechanism mounted on a frame of any suitable type and construction, which, as shown, comprises a rear frame member or plate 11 and a face plate 12, said plates being held in spaced relation in any suitable manner as by the spacers 13 and screws 14. Mounted in the frame thus constituted is a pressure responsive element of any suitable type 15, that is adapted to operate any suitable indicator or pointer such as 16 when a pressure differential is established between the pressure inside the element and the pressure within the casing and surrounding said element on the outside thereof. This pressure differential may be produced, for example, by providing communication between the inside of the pressure responsive element and the atmosphere outside the casing of the instrument, while interposing diffusing means between the outside atmosphere and the inside of the casing, as illustrated and described, for example, in the copending application of James E. Bevins, Serial No. 101,348, filed September 17, 1936, now Patent 2,147,962, granted February 21, 1939.

As shown in the drawings, by way of example, the pressure responsive element 15 comprises a diaphragm capsule mounted in any suitable manner on a flexible arm 17 comprising the novel means of the present invention.

As illustrated in Figs. 1 to 4, inclusive, said novel means may comprise channel-shaped element 18 having a base 19 and upwardly extending sides 19a, said base being provided with slits 20 cut therein as illustrated in Fig. 3, whereby a resilient tongue 19b is provided for flexibly supporting the channel in place. A block 21 extends across the tongue 19b between said tongue and a bracket 22. Screws 23 passing through said tongue 19b and block 21 resiliently attach the channel to bracket 22. Bracket 22 is provided with upwardly extending arms 24, extending on both sides of said channel, and these arms are attached to the rear frame member on plate 11 by means of screws 25. Arms 24 are sufficiently spaced from the sides of channel element 18 so that said element may move between said arms without contacting the same. Channel 18 is thereby held in position with respect to the other elements of the mechanism with a portion of said channel extending through an opening 26 in rear plate 11, the sides 19a being provided with integral upwardly extending ears 27 adjacent the extremities of which is rotatably mounted the roller 27a on axle 28 held in place in said ears 27.

A sliding internally threaded block 29 which is held in slidable position by ears 27 is mounted on threaded bolt 31, whereby said block may be adjustably positioned upwardly and downwardly in order to provide a zero adjustment of the diaphragm as will be described in detail later.

On the opposite end of the channel 18 and carried by the ears 32 is a roller 33 rotatably mounted on axle 34 held in place in said ears 32. Roller 33 is cooperatively positioned with respect to the conical end 35a of threaded adjustment screw 35 which cooperates with screw threads 36 on the interior of an I-shaped element 37 fastened to the face plate 12 by means of lugs 38 and cooperating screw elements (not shown). Screw 35 may be rotated by inserting a tool such as a screw-driver in slot 39 thereof, whereby the cooperative position of the conical end 35a with respect to roller 33 may be adjusted to, in turn, adjust the zero position of the instrument, this zero adjustment being utilized after the novel compensating means have been adjusted by means of elements 29 and 31.

A second, channel-shaped element 40 is mounted in inverted position with respect to channel element 18. The second channel element comprises a base 41 with sides 42 integral therewith and extending downwardly therefrom, said sides being cut as shown at 43 whereby the second channel element may be moved about slot 43 as a fulcrum. Downwardly extending wings 44, also integral with base 41, are fastened to the upwardly extending sides 19a of channel element 18 by means of rivets or the like 45 as illustrated in Fig. 2. A block 46 is fastened to a tapped opening in base 41 by means of screw 47.

A thin metallic strip 48, which is readily responsive to changes in temperature, is attached at one end to the block 46 by brazing or in any other desired manner and extends over the top of block 46, screw 47 and roller 27a and is attached to the adjustable block 29 by means of rivets 49, as shown in Fig. 2. The tension on the thin strip 48 may, therefore, be adjusted by means of screw 31 and block 29 to, in turn, adjust the zero position of the diaphragm as will now be described in detail.

A hollow post 50 is fastened to the base 41 in any suitable manner as, for example, by peening the end of the post over against said base 41 and thereby holding said post in place by means of shoulder 50a and peen-over portion 50b. A hollow internally threaded block 51 having a rounded extension 52 integral therewith is fastened to the post 50 by placing extension 52 within the hollow post 50, the block 51 being held in place within said post 50 by means of set screw 53 extending through the wall of the hollow post and cooperating with extension 52.

Pressure responsive diaphragm 15 is provided with a hollow central boss 54 (see Fig. 2) communicating with the interior of said diaphragm. The central boss 54 is provided with a threaded portion 55 which is connected to the block 51, the block 51 being first screwed to the threaded portion 55 and the extension 52 of said block 51 being then inserted into the post 50 whereby the diaphragm 15 is held in position connected to the novel compensating means 17 by means of set screw 53 as described above.

Upon adjustment of the tension of the thin strip 48 by means of screw 31 and block 29, the zero position of the diaphragm 15 may be thus initially adjusted while the compensating element 17 is being mounted in position and adjusted for the proper compensating effect.

After the compensating element 17 has been adjusted, a further adjustment of the diaphragm position may be obtained by means of the conically shaped threaded screw 35 cooperating with the roller 33 to adjust the position of the compensating element 17 in its entirety.

A tube 56 is connected to the central boss 54 of the diaphragm whereby the interior of diaphragm 15 is placed in communication with the atmosphere outside the instrument in any suitable manner. As shown in Fig. 1, said tube 56 leads to a coupling member 57 that is suitably vented to the outside atmosphere as hereinafter described.

In the manner shown and described in the above-mentioned copending application Serial No. 101,348, suitable actuating connections and pressure differential means are provided for operatively assembling the mechanism of the instrument.

Referring to Fig. 1, suitable actuating connections are provided between said pressure responsive element 15 and the indicator or pointer 16. In the form shown, a post 58 extends centrally of diaphragm 15 on the side opposite from the boss 54 and is pivotally connected at 59 with one end of a rock-shaft arm 60 adjustably mounted in a collar 61 by a set screw 62 for rotation about a rock-shaft 63 journaled in a U-shaped bracket 64 which is fastened at its base 64a in any desired manner to the rear plate 11. A block 65 is mounted for rotation with rock-shaft 63 and is provided with an arm 66 extending from one side thereof and an adjustable counterweight comprising wheel 67 mounted on screw 68 extending from the other side thereof. Arm 66, shown as partly behind rock-shaft arm 60 in Fig. 1, is swung about the rock-shaft 63 in response to contraction and expansion of diaphragm 15.

Suitably mounted on face plate 12, as by means of spacers 69 and screws 70, is a plate 71 in which is suitably mounted a spindle 72. An arm or finger 73 extends from the spindle 72 and is engaged by the arm 66 for rotation thereby in one direction, and a siutable hairspring 74 tends to rotate the spindle 72 in the opposite direction whereby expansion and contraction of the pressure responsive element 15 is converted into rotation of the said spindle 72 in one direction or the other.

A counterweighted gear sector 75 carried by spindle 72 meshes with a pinion 76 on a second spindle 77 that is rotatably mounted in a plate 78 held in spaced relation from the first plate by suitable spacers 79 and screws 80. The spindle 77 extends through face plate 12 and carries at its outer end the pointer 16.

The above-described mechanism is mounted in the casing 10 which may be of any suitable material such as "Bakelite," the face plate 12 being seated against shoulder 81 formed in said casing and being held therein by a split ring 82 which expands into groove 83 also formed in said casing. The casing is suitably closed as by means of a split spacing ring 84 and a cover glass 85 held in place by resilient ring 86 to thereby seal the casing at one end thereof.

The sole remaining opening in the casing is sealed by means of coupling member 57 provided with ears 57a engaged by bolts 87 extending through casing 10, whereby a tight seal is provided between said coupling member and a bushing 88, a suitable washer or gasket 89 being provided for this purpose if desired. Bushing 88 is internally threaded to receive a nipple 90 to which may be connected a suitable tube fitting, whereby the pressure responsive instrument may be vented to any desired point remote from the instrument itself.

Diffusion means of the type described in said above-mentioned copending application 101,349, for example, provide means whereby equalization of the pressure inside and outside of diaphragm 15 may be properly regulated. In the present embodiment, said means comprise a hollow member 91 suitably connected to coupling member 57 by an airtight connection. Suitable diffusing elements are provided for closing the ends of said hollow member 91. One of said elements, which is shown as a hollow porcelain tube 92 closed at one end and connected to the hollow member 91 at the other end, closes the right hand end of hollow member 91 and controls the diffusion of air between the inside of the instrument casing and the interior of said hollow member 91, while a second similar porcelain member (not shown) is located within the hollow member 91 and controls the diffusion of air between the interior of said hollow member and the outside atmosphere by means of coupling member 57 and nipple 90. The hollow member 91 is also provided with an outlet in which is disposed a temperature controlled bypass valve, the stem 93 of which is controlled in its position by the temperature responsive element 94 adjustably positioned by screw 95. It is to be noted that temperature responsive element 94 is responsive to the amount of temperature change and is not actuated in response to the rate of said temperature change. The details of said diffusing means do not constitute a part of the present invention and are fully illustrated and described in said above-mentioned application 101,348 to which reference is hereby made for the details of the construction thereof.

Referring to Fig. 5, another embodiment of the novel means of the present invention is illustrated in conjunction with the entire mechanism. The details of this embodiment are shown more clearly in Fig. 6.

The bottom channel 18 and the top channel 40 of the embodiment shown in Figs. 1 to 4, inclusive, are combined in the embodiment illustrated in Figs. 5 and 6 into one element comprising base 96 the sides 97 of which include a portion 97a extending upwardly to connect integrally with the base 98 of the upper channel-shaped member. The sides 99 of the upper channel member are turned upwardly in this embodiment, so that the pivoting point is located at 100, the point of reversal of the upwardly and the downwardly extending sides of the upper channel member. A triangular-shaped block 101 is brazed to the base 98 and the thin strip 48 is adjustably connected thereto by means of washer 102 and screw 103 and is adjustably connected to block 29 by screws 103a and strip 103b. The remainder of this embodiment of the novel compensating means is generically the same as illustrated in Figs. 1 to 4, inclusive.

In Fig. 7 is illustrated a further embodiment of the novel rate of temperature change compensating means. In this embodiment, the upper channel 40 of Figs. 1 to 4, inclusive, is eliminated entirely in order to simplify the construction of the compensating means the bottom channel being constructed as shown at 18a. Thin strip 48 is illustrated as passing over an intermediate roller 104 before being attached to the block 105 by means of the screw 106. Expansion and contraction of the thin strip 48 causes movement of the block about the shaft 107 upon which block 105 is mounted. Block 105 and spring 108 are joined by link 109. Upon movement of the block due to expansion or contraction of strip 48 diaphragm 15 is moved accordingly.

The operation of the device is as follows: When the pressure inside and outside the element 15, or in other words, the pressure inside of element 15 and inside of casing 10 are equal, pointer 16 may be adjusted to read zero on a suitable scale by means of the adjusting screw 35 in Fig. 1, which shifts the position of element 15 as described in detail above.

Now, if there is an increase in altitude, the atmospheric pressure surrounding the instrument decreases in proportion to the rate of change in altitude or the rate of climb and the pressure within diaphragm 15 decreases correspondingly since this element is in open communication with the atmospheric pressure. The pressure within the casing 10, however, cannot instantly equalize with the outside atmospheric pressure as the gases within the casing must escape by means of the diffusing means including porcelain tube 92. The pressure within casing 10, therefore, remains greater than the pressure of the atmosphere and hence greater than the pressure within diaphragm 15 so that diaphragm 15 is compressed to thereby actuate the pointer 16 to indicate the rate of climb. If the increase in altitude is stopped and the instrument remains at a constant altitude, then the gases in casing 10 will escape through the diffusing means until the pressures within the casing and within diaphragm 15 are equal.

Whenever a pressure differential is caused between the pressure inside of the casing 10 and the pressure of diaphragm 15, a certain period of time must elapse before the pressure can be equalized even though the atmospheric pressure remains constant. It is due to this fact that the novel means of the present invention are utilized.

If we assume, for example, that an instrument of the character described is mounted on an aircraft which is located in a heated hangar and that the craft is suddenly wheeled out of said hangar into a cold atmosphere, the sudden change of temperature will cause a reduction of the pressure inside of the casing because the volume of said casing remains substantially constant. While the pressure inside of the diaphragm is likewise momentarily reduced, the interior of the diaphragm being directly connected to the atmosphere, there quickly ensues a flow of air to said interior thereby maintaining the pressure therein at the full atmospheric pressure.

The reduction in pressure within the casing, however, cannot be instantly equalized by ordinary means since the diffusing means will permit only a regulated flow of air therethrough. This sudden reduction in pressure within the casing, while the pressure is maintained at full atmospheric pressure within the diaphragm, causes diaphragm 15 to expand to thereby erroneously indicate a rate of climb, which in this case would be indicative of descent instead of climb as the pressure inside of casing 10 is reduced. On instruments as previously provided, this error will not be compensated for with sufficient dispatch, particularly when the craft must immediately take flight.

Upon such a reduction in the air pressure within the casing, which reduction is due to a reduction in temperature, the thin strip 48, which is actuated by the rate of temperature change, is contracted in proportion to said rate of change of temperature since its thinness is such that it responds at greater speed to the temperature change than the remainder of the device to which the thin strip is attached. Upon contraction of strip 48, the upper channel element 40 is pivoted about the slit 43 to thereby lift the upper channel element 40, its base 41, hollow post 50, block 51 and central boss 54 of the diaphragm 15 to thereby bodily raise the diaphragm to compensate for the expansion of the diaphragm that took place upon the reduction of pressure within casing 10, which reduction in pressure accompanied the sudden reduction in temperature.

As thin strip 48 is actuated only by rate of change in temperature, it will be noted that as the different parts of the instrument assume the same temperature, the relative contraction of the strip is reduced until eliminated entirely. At the same time, however, the reduction of pressure, due to the decrease of temperature, is also slowly dissipated due to the leakage through the diffusing means. The novel means of the present invention, therefore, comprise means whereby changes in the indication of the instrument due to sudden changes of temperature are compensated, said novel means thus serving as a rate of change of temperature compensating means.

Further, while the novel means of the invention have been described as utilized in combination with a self-contained instrument, namely, one in which the casing of the instrument contains the volume of air, said means may also be utilized with the separate expansion chamber type of instrument since, by a study of the relationship between the temperature changes in the expansion chamber and the temperature changes in the casing, the novel compensating means can be so adjusted as to compensate the instrument for rate of change of temperature within the expansion chamber.

Although several embodiments of the invention have been illustrated and described, other changes and modifications in form, materials and relative arrangement of parts, which will now appear to those skilled in the art, may be made without departing from the scope of the invention.

Reference, therefore, is to be had to the appended claims for a definition of the limits of the invention.

What is claimed is:

1. In a device of the character described, means responsive to a pressure differential, and means responsive to change of temperature affecting said device and effective only upon a rapid rate of change of temperature for bodily shifting said differential pressure responsive means to compensate errors which would otherwise be produced by changes in said temperature.

2. In an instrument of the class described, a substantially airtight casing, a pressure responsive element within said casing in communication with the atmosphere outside of said casing, retarding means whereby said casing is in communication with the atmosphere outside thereof, and temperature responsive means in said casing effective only upon a rapid rate of change of temperature for modifying the operation of said pressure responsive element.

3. In an instrument of the character described, a diaphragm, means leading from one side of said diaphragm to a source of varying pressure, flow retarding means leading from the other side of said diaphragm to said source, and means responsive to change of temperature affecting said instrument, and effective only upon a rapid rate of change of temperature, said means comprising a thin metal strip and means connecting said diaphragm and said strip whereby upon extension and contraction thereof said diaphragm is displaced.

4. An instrument of the character described, comprising a pressure responsive element and means mounting said element in position comprising a channel-shaped element resiliently fixed in position, means for flexing said channel-shaped element, a second channel-shaped element connected to said first channel element, means providing a pivot point about which said second channel may be adjusted, a thin metal strip attached to said second channel element at one end of said strip, means adjustably fixing the other end of said strip whereby the tension thereon may be adjusted, and means connecting said second channel to said pressure responsive element whereby upon expansion and contraction of said strip the position of said pressure responsive element is adjusted.

5. In a device of the character described, a pressure responsive element, indicating means connected to said element for positioning thereby and means responsive to rate of temperature change for modifying the indication of said indicating means comprising a first channel, means resiliently fixing said channel in position, a second channel integral with said first channel and opposite thereto, means providing a pivot point in said second channel about which said second channel may be rocked, a thin strip attached at one end to said second channel whereby said second channel may be rocked about said pivot point upon expansion and contraction of said thin strip, and means connecting said second channel to said pressure responsive element for moving the latter axially upon expansion and contraction of said strip.

6. In a device of the character described, a pressure responsive element, indicating means connected to said pressure responsive element for indicating the value of the pressure differential actuating said element, and means responsive to rate of change of temperature for modifying the indication of said indicating means, comprising a channel, means resiliently mounting said channel in position, a thin strip attached at one end thereof to said channel means for adjusting the tension of said strip, said strip rocking said channel about its resilient mounting upon the expansion and contraction of said strip, and means connecting said channel to said pressure responsive element for bodily moving the latter along its operating axis upon rocking movement of said channel.

7. A temperature rate of change compensating element comprising a channel, slits in the bottom of said channel providing a resilient mounting therefor, a second channel mounted opposite to said first channel and connected thereto, a slit in the sides of said second channel, and a thin strip of thermally expansible material connecting said first and second channels whereby said second channel is rocked about said slits therein upon expansion and contraction of said thin strip.

8. In combination, an expansible diaphragm having a yielding wall subject to atmospheric pressure on one side thereof, means for retarding the rate at which pressure on the other side of said yielding wall tends to become equal to a changing atmospheric pressure due to changes in altitude, means actuated by said yielding wall in accordance with the rate of change in altitude, and means responsive to change of temperature affecting said diaphragm and effective only upon a rapid rate of change of temperature for modifying the action of said actuated means.

9. In an instrument responsive to variations in pressure of the atmospheric air the combination with a chamber enclosing a volume of air; a pressure responsive member acted upon by the pressure of said volume of air; and indicating means connected to be actuated by said pressure responsive member; of an element responsive to a change in temperature affecting at least a part of said instrument and effective only upon a rapid rate of change of temperature, said element being connected to vary the operative relation between said pressure responsive member and said indicating means.

10. In a vertical speed indicator the combination with a chamber enclosing a volume of air; a differential pressure responsive member connected to respond to a difference in pressure between said chamber and the atmospheric air; a constricted passage connecting said chamber with the atmosphere; and indicating means connected to be actuated by said pressure responsive member; of an element responsive to a change in temperature affecting at least a part of said instrument and effective only upon a rapid rate of change of temperature, said element being connected to vary the operative relation between said pressure responsive member and said indicating means.

11. A vertical speed indicator comprising, in combination, a chamber enclosing a volume of air; a differential pressure responsive member connected to respond to a difference in pressure between said chamber and the atmospheric air; a constricted passage connecting said chamber with the atmosphere; indicating means connected to be actuated by said pressure responsive member, and means including two temperature responsive elements, one of said elements being arranged to assume, upon a change in temperature affecting said instrument, the temperature of the other element with a predetermined lag in time, said temperature responsive elements being arranged to increase and decrease the reading of the indicating means in response to a difference in temperature between said elements.

12. In an indicating instrument the combination of indicating means; a first temperature responsive element; a second temperature responsive element arranged to assume, upon a change in temperature, the temperature of said first element with a predetermined lag in time, said elements being connected to actuate said indicating means in response to a difference in temperature of said elements.

ALFRED E. SIDWELL.